(12) United States Patent
Mochizuki et al.

(10) Patent No.: US 9,610,645 B2
(45) Date of Patent: Apr. 4, 2017

(54) DESOLDERING TOOL AND CONTROL SYSTEM

(71) Applicant: Hakko Corporation, Osaka (JP)

(72) Inventors: Toshikazu Mochizuki, Osaka (JP); Hitoshi Takeuchi, Osaka (JP); Tetsuo Yokoyama, Osaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 14/943,977

(22) Filed: Nov. 17, 2015

(65) Prior Publication Data

US 2016/0175959 A1 Jun. 23, 2016

Related U.S. Application Data

(60) Provisional application No. 62/094,687, filed on Dec. 19, 2014.

(51) Int. Cl.
| | |
|---|---|
| *B23K 1/018* | (2006.01) |
| *B23K 3/02* | (2006.01) |
| *B23K 3/08* | (2006.01) |
| *B23K 1/00* | (2006.01) |
| *B23K 3/03* | (2006.01) |
| *B23K 101/42* | (2006.01) |

(52) U.S. Cl.
CPC .......... *B23K 3/029* (2013.01); *B23K 1/0016* (2013.01); *B23K 1/018* (2013.01); *B23K 3/0315* (2013.01); *B23K 3/0353* (2013.01); *B23K 3/08* (2013.01); *B23K 2201/42* (2013.01)

(58) Field of Classification Search
CPC .......... B23K 1/018; B23K 3/029; B23K 3/00; B23K 3/033

USPC .................................................. 228/191, 264
See application file for complete search history.

(56) References Cited

U.S. PATENT DOCUMENTS

| | | | | |
|---|---|---|---|---|
| 3,172,382 A | * | 3/1965 | Weglin ............... | B23K 1/018 219/227 |
| 4,435,636 A | * | 3/1984 | Royston ............... | B23K 1/018 16/431 |
| 4,439,667 A | * | 3/1984 | Sylvia ............... | B23K 1/018 15/344 |
| 5,579,982 A | * | 12/1996 | McDavid, Jr. ......... | B23K 1/018 219/230 |
| 6,057,527 A | | 5/2000 | Kilmer | |
| 6,237,831 B1 | | 5/2001 | Lawrence et al. | |
| 6,393,336 B1 | * | 5/2002 | Kano ............... | G01L 27/007 700/228 |
| 7,325,714 B2 | | 2/2008 | Mochizuki | |

FOREIGN PATENT DOCUMENTS

| | | | | |
|---|---|---|---|---|
| DE | EP 2196277 A1 | * | 6/2010 | ........ B23K 9/0953 |
| GB | 1415621 A | * | 11/1975 | ........ B23K 35/26 |
| JP | 2826877 B | | 10/1991 | |
| JP | H0320863 A | | 10/1991 | |

(Continued)

OTHER PUBLICATIONS

JP 2008105074 A computer english translation Apr. 26, 2016.*
EP 2196277 A1 computer english translation Apr. 26, 2016.*

*Primary Examiner* — Erin Saad
(74) *Attorney, Agent, or Firm* — David B. Abel

(57) ABSTRACT

A desoldering tool and control system including enhanced features for detecting solder clogging as well as on-delay and sleep mode functions to enhance the life of the desoldering tool components.

28 Claims, 10 Drawing Sheets

(56) References Cited

FOREIGN PATENT DOCUMENTS

| | | | |
|---|---|---|---|
| JP | 2838573 | B | 1/1992 |
| JP | H06-257024 | | 9/1994 |
| JP | H09-84811 | A | 3/1997 |
| JP | 2000-79464 | | 3/2000 |
| JP | A2001-358453 | | 12/2001 |
| JP | A2004322152 | A | 11/2004 |
| JP | 2006341269 | A | 12/2006 |
| JP | 2008105074 | A * | 5/2008 |
| JP | 2014-1244648 | | 7/2014 |
| KR | 2002065975 | A * | 8/2002 |

\* cited by examiner

DESOLDERING TOOL AND CONTROL SYSTEM

FIELD OF THE INVENTION

The present invention relates to a desoldering tool or desoldering iron and its associated controller and control system. The desoldering tool includes a housing, a filter assembly and a heater assembly. The controller includes a power supply and a vacuum pump. The controller provides power to the heater assembly of the desoldering tool. The controller's vacuum pump is connected to the desoldering iron filter and heater assembly via a tube and channel though the desoldering tool to the tip or nozzle of the heater assembly. The desoldering tool and controller system are used to melt and remove solder from electrical components to allow repairs, replacement or reworking of the electrical components.

BACKGROUND OF THE INVENTION

Desoldering systems are used in the electronics industry to repair and refurbish electrical components. For example, desoldering systems may be used to remove solder that secures an electrical component to a circuit board. In these uses, it is preferable to not only melt the solder to allow removal of the electrical component but to also remove the solder so that a new electrical component can be more easily put in place and then secured via soldering to the circuit board. Accordingly, desoldering systems that include both a heating element and a vacuum nozzle to remove the liquefied solder are in use in the industry. A drawback of the present desoldering systems is that they are subject to clogging which requires frequent cleaning and corresponding downtime from the reworking or repair processes. Clogging often occurs in the desoldering tool at the nozzle or in a filter, and at the desoldering control system and source of an applied vacuum. A user becomes aware of the clog in the system when the solder is not being removed. To clear the clog from the system, the user generally needs to disassemble a number of components to identify the location of the clog and take remedial action.

Presently, there are soldering/desoldering tools that have a sleep mode function which include a vibration sensor in the soldering/desoldering tool. However, the vibration sensor could fail to determine a small shock and turn in to sleep mode when the tool is in use, or wake up by sensing a shock to a work bench when the tool is not in use. Other types of tools include a sensor which monitors the temperature drop of the tool. Monitoring the temperature could fail to determine use of the tool with very small load to the solder tip or desolder nozzle.

The present invention is primarily directed to minimizing the occurrences of clogging and expedite the cleaning process by identifying the location of the clog for the user. The sleep mode of the present invention is configured to resolve the limitations of the prior art designs.

BRIEF DESCRIPTION OF THE INVENTION

A first purpose of the invention is to provide the user an easy way to alert that the tool needs cleaning. The invention detects solder and flux clogged in the desoldering tool, and alerts the user that cleaning of the tool is necessary. The invention is done by detecting the negative pressure with a sensor connected to the vacuum source, and when the sensed pressure goes above certain threshold, the controller indicates that cleaning is necessary.

The invention also contemplates an "on-delay" functionality for the application of a vacuum source for the desoldering tool and user selectable and adjustable "off-delay" functionality. The aim of the "on-delay" functionality is to reach vacuum pressure in a short period of time, and the "off-delay functionality is to avoid solder clogging inside the path of suction and absorb solder completely to the solder collecting chamber.

The invention also contemplates a sleep mode function unique to a desoldering iron. It assures reliable timing to enter sleep mode and to wake up from the sleep mode, able to operate right at the hand held tool. This is done mainly by triggering the trigger on the desoldering tool, same as the trigger to trigger the vacuum source. It benefits from other type of sleep mode by reliability, since the trigger is used by the operators will. The trigger here is the same trigger to turn ON the vacuum source, so it is easy to operate, no extra buttons needed, also always easy-to-reach.

DETAILED DESCRIPTION OF THE INVENTION

Figure 1:
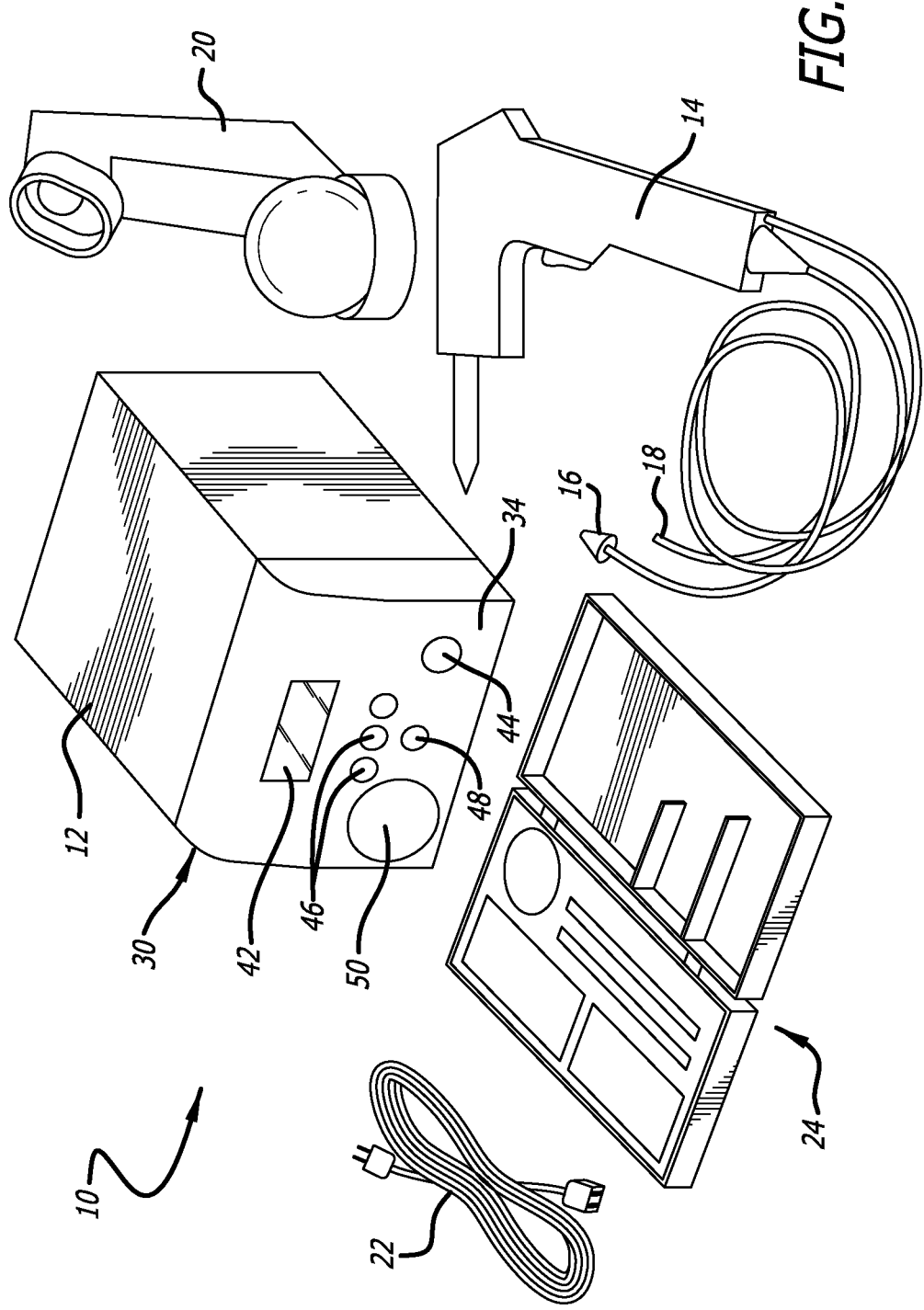
FIG. 1 is a perspective view of the main components of the desoldering system of the present invention.

FIG. 1 is a perspective view of the main components of the desoldering system 10 of the present invention. The desoldering system 10 includes a controller 12 and a desoldering tool 14. The desoldering tool 14 is removably connected to the controller 12 via a cable 16 and vacuum conduit 18. Auxiliary components include a tool holder 20, power cable 22 (for the controller), and a maintenance kit 24.

Figure 2:
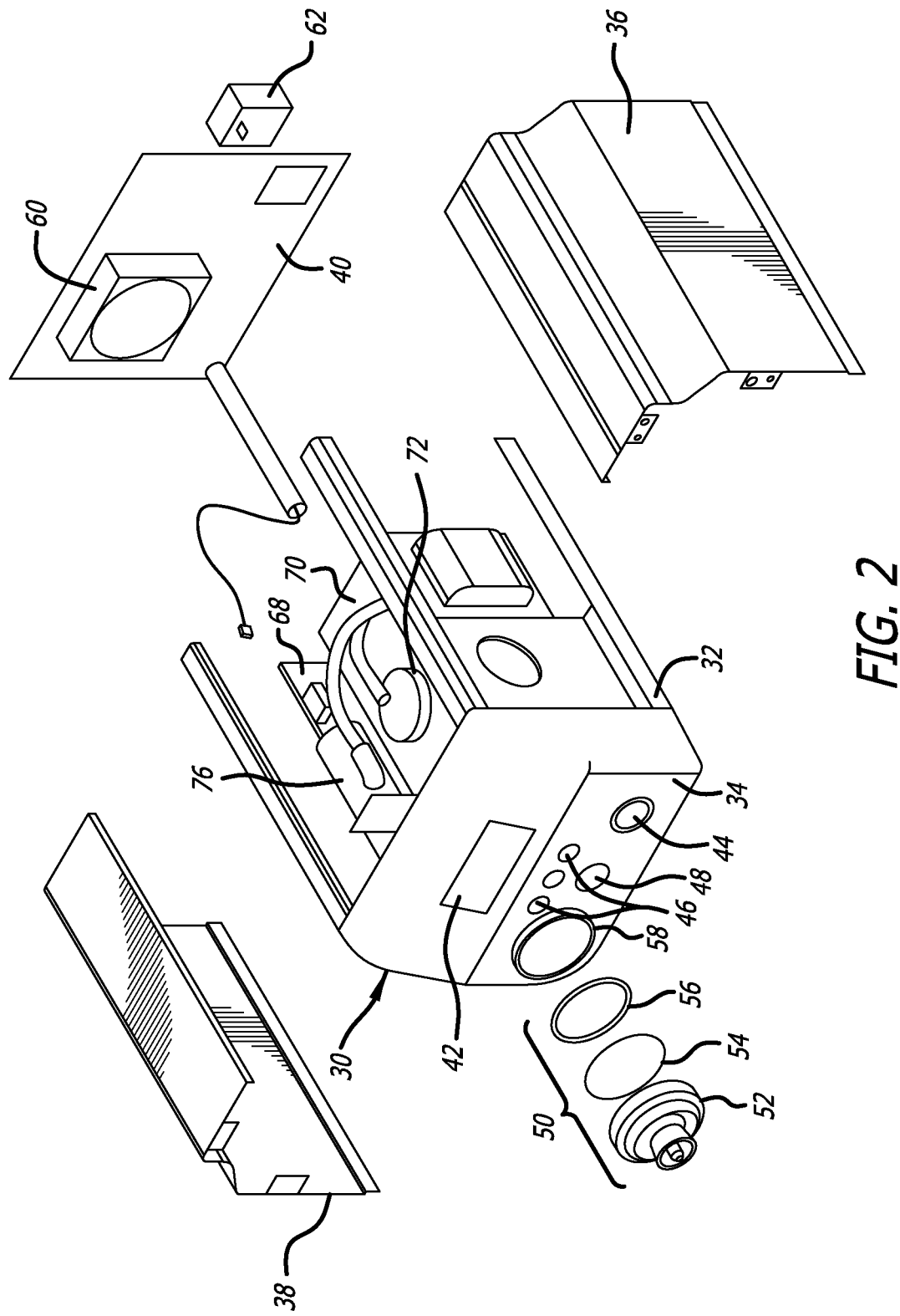
FIG. 2 is a perspective partial exploded view of the controller of the desoldering system of the present invention.

FIG. 2 is a perspective partial exploded view of the controller 12 of the desoldering system 10 of the present invention. The controller 12 includes a housing 30 comprising a base 32, a front face 34, sides 36 and 38 and a rear panel 40. The front face includes a display 42, for example on LED (light emitting diode) display, a power switch 44, control buttons 46, cable connector 48 and vacuum conduit port assembly 50. The vacuum conduit port assembly 50 includes an outlet cap 52, filter 54, O-ring 56, and filter support 58. The outlet cap 52 threadably engages the filter support 58, allowing access to and removal of the filter 54. The rear panel 40 preferably includes a cooling fan 60 and power cord receptacle 62.

Figure 6:
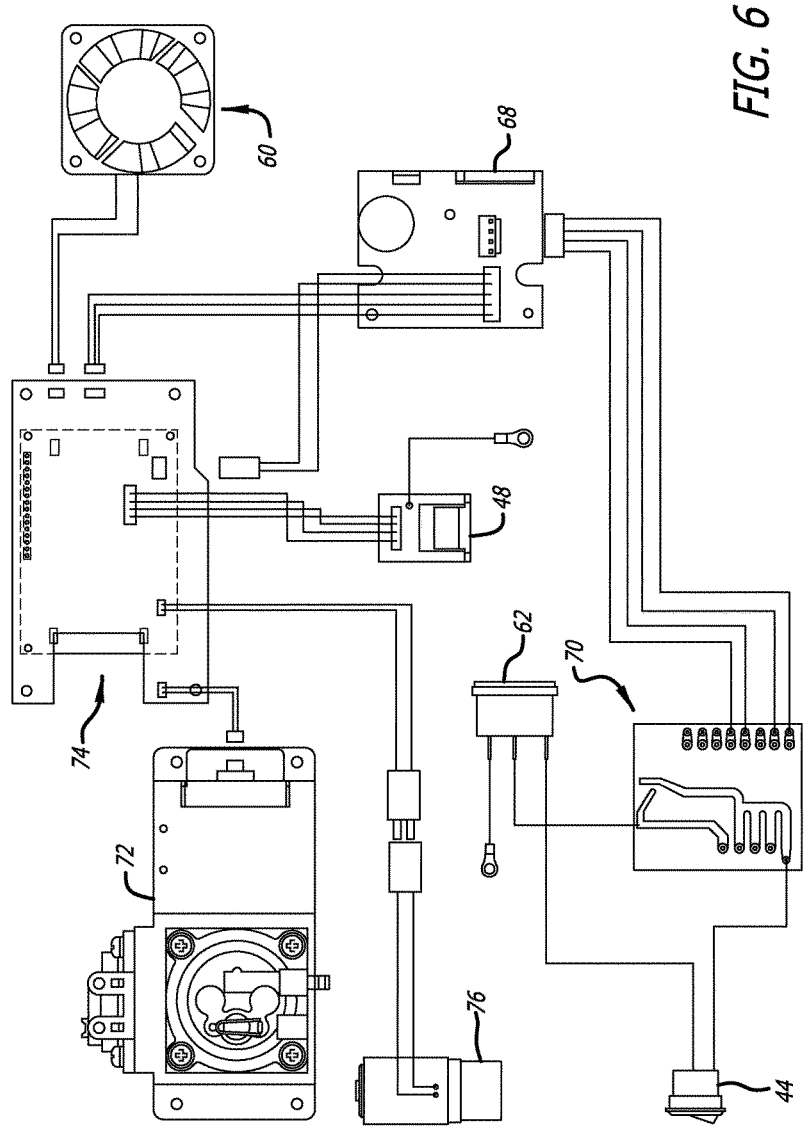
FIG. 6 is a wiring diagram of the main components of the controller of FIG. 2.

Within the housing 30, mounted to the base 32, the controller 12 includes a power supply assembly 70, a vacuum pump 72, and a controller circuit board 74 as well as a solenoid 76 as shown in FIG. 6. The solenoid 76 is positioned between the vacuum pump 72 and the filter 54 of the controller 12. Various wires connect the respective primary components. The vacuum pump 72 is connected to the interior side of the vacuum conduit port assembly via a tube and a pressure sensor (not shown).

Figure 3:
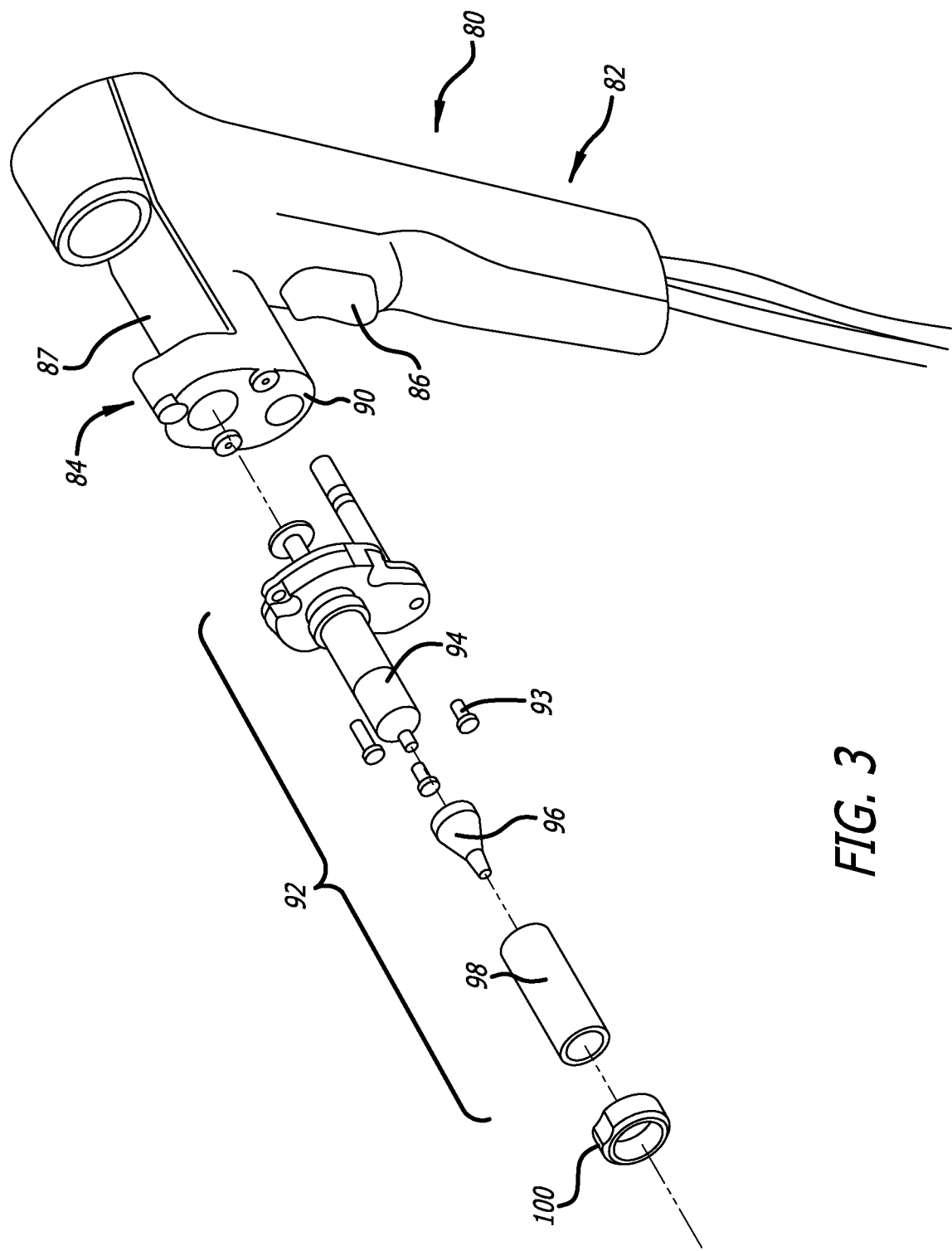
FIG. 3 is a perspective partial exploded view of the desoldering tool of the desoldering system of the present invention.

FIG. 3 is a perspective partial exploded view of the desoldering tool 14 of the desoldering system 10 of the present invention. The desoldering tool 14 includes a handle assembly 80 with a grip section 82 and a top section 84. The grip section 82 is preferably ergonomically designed to be held by hand, and includes an on/off trigger 86. The cable 16 and vacuum conduit 18 extend from the bottom end of the grip section 82. The top section 84 includes a filter chamber 87 for a removable filter assembly 88. The top section 84 also includes a forward face 90 to mount a heater assembly 92. The heater assembly 92 may be removably affixed to the forward face 90, for example, by a plurality of screws 93. The heater assembly 92, as shown in the exploded view of FIG. 3, includes a heating element 94, a nozzle 96, an element cover 98 and a nut 100 to secure the nozzle 96 and element cover 98 to the heating element 94.

Figure 4:
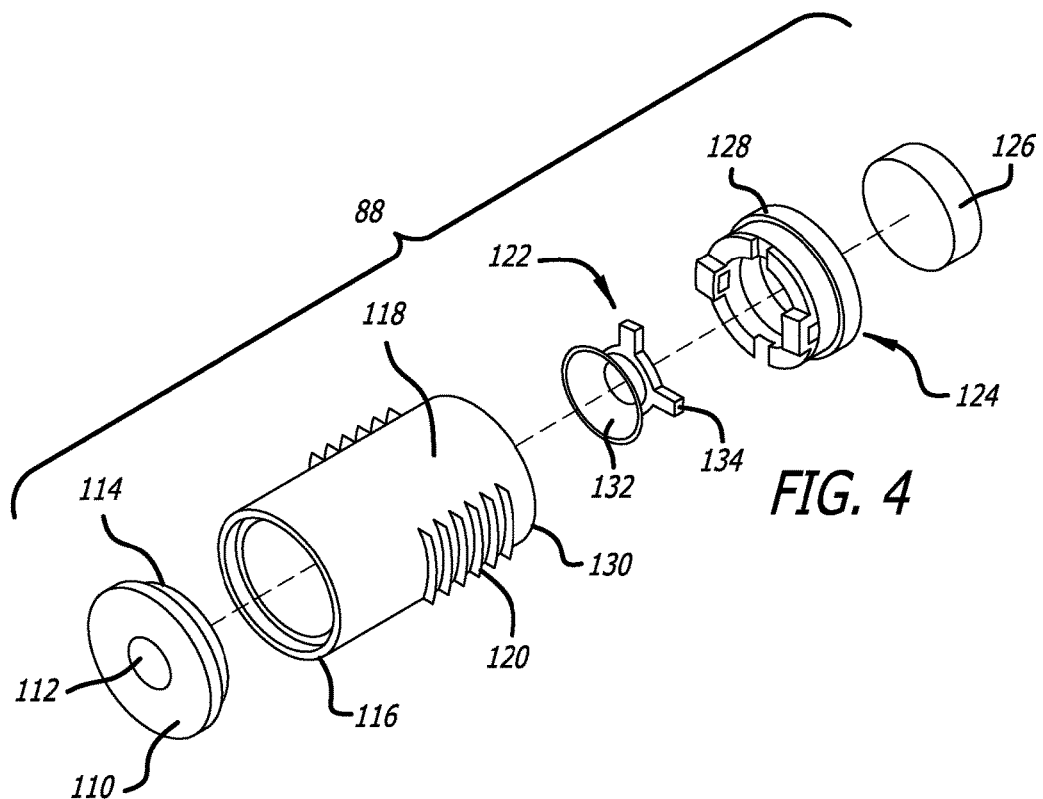
FIG. 4 is a cross sectional view of the filter assembly for the desoldering tool of FIG. 3.

The removable filter assembly 88 of FIG. 3, as also shown in the cross sectional view of FIG. 4, comprises a generally disk shaped front holder 110, including an axial orifice 112 and a threaded periphery 114 to allow attachment to a forward end 116 of a cylindrical chamber element 118. As depicted, the cylindrical chamber element 118 includes exterior ribs 120 to aid removal. The filter assembly 88 further includes a pre-filter solder collector 122, a filter holder 124 and a filter 126. Preferably, the filter 126 is a ceramic paper filter. The filter holder 124 includes a threaded periphery 128 to allow the filter holder 124, as well as the pre-filter solder collector 122 and filter 126, to be secured to a proximal end 130 of the cylindrical chamber element 118. As depicted in FIG. 4, the pre-filter solder collector 122 preferably includes a cone shaped solder collector 132 and a mounting base 134, the mounting base 134 being configured to engage the filter holder 124. The cone shaped solder collector 132 is positioned near the proximal end 130 of the cylindrical chamber element 118 and designed such that droplets of liquid solder entering the filter assembly 88 contact and solidify inside of the cone shaped solder collector 132, to aid removal of the accumulated solder from the filter assembly 88. The cone shaped solder collector 132 is preferably formed from a material having a low solder wettability such as stainless steel as solder will not strongly adhere to stainless steel and the accumulated solder may thus be easily removed from the solder collector 132 and reprocessed. The mounting base 134 may also be formed from stainless steel to ease cleaning, and spot welded to the solder collector 132. However, mounting base 134 may be made from other materials and secured to the solder collector in any known manner to reduce costs.

Figure 5:
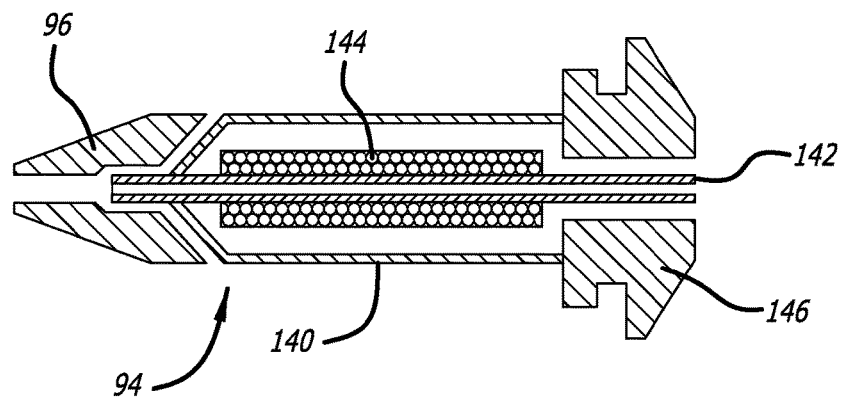
FIG. 5 is a perspective cross sectional schematic view of the heating element of the desoldering tool.

FIG. 5 is a cross sectional schematic view of the heating element 94 of the heater assembly 92 of the desoldering tool 14. The heating element 94 includes a generally cylindrical cover 140, an axially disposed thermal cylinder element 142, and a heater coil 144 surrounding the thermal cylinder element 142, all affixed to a mounting base 146. The heater coil 144 is configured to extend for almost the entire length of the thermal cylinder element 142 to ensure that the solder that is melted and removed through an applied vacuum through the center of the thermal cylinder element 142 does not adhere to and solidify against the internal wall of the thermal cylinder element 142. Upon installation of the heating element 94 on the forward face 90 of the top section 84 of the desoldering tool 14, a distal end of the thermal cylinder element 142 is configured to insert into the axial orifice 112 of the disk shaped front holder 110 of the filter assembly 88 of FIGS. 3 and 4, whereby the liquefied and removed solder is maintained at a liquefied temperature at least up to the point where it enters the chamber element 118 of filter assembly 88.

FIG. 6 is a wiring schematic diagram of the main components of the controller 12, including the power switch 44, cable connector 48, power cord receptacle 62, power circuit board 68, power supply assembly 70, vacuum pump 72, and the controller circuit board 74. The diagram also shows the cooling fan 60, and solenoid 76. The controller circuit board 74 includes a processor and memory element for storing and executing a control program for the desoldering system 10. In addition, the controller circuit board 74 has the display 42, for example an LCD display, and the control buttons 46 mounted on one side. The controller circuit board 74 also includes a pressure sensor and the electrical components associated with the processor for the heater control, zero cross detection, valve control and pump control functions of the controller 12. FIG. 6 also schematically depicts the primary wiring connections of the controller 12.

As noted above, the controller 12 includes a processor and memory element as shown in FIG. 6 for storing and executing a control program for the desoldering system 10. The desoldering system 10 may be used to melt and remove solder from electrical components to allow repairs, remanufacture and reworking of the electrical components. With the desoldering tool 14 connected to the controller 12 and the power switch 44 of the controller 12 in the "on" position, a user activates the desoldering tool 14 by depressing the trigger 86 signaling the controller to activate the vacuum pump 72 and as discussed herein below the reinstatement of the power supply to the heater coil 144 of the heater assembly 92 if the controller is gone into a sleep mode. The application of power to the heater coil 144 heats the thermal cylinder element 142 and, by thermal conduction, the nozzle 96. When the nozzle 96 is placed over or proximate to the solder connection to be re-worked, the heat provided by the heater assembly 92 melts the solder, and the applied vacuum pulls the melted solder axially though the thermal cylinder element 142 and into the cylindrical chamber element 118 of the filter assembly 88.

The melted solder enters the cylindrical chamber element 118 dispersed in the airstream being pulled by the applied vacuum. As the solder is far denser than the air being pulled toward the applied vacuum, the solder entering through an opening at the axis of the cylindrical chamber element 118 gathers and solidifies inside of the cone of the pre-filter solder collector 122 while the airflow is diverted around the pre-filter solder collector 122. As the solder accumulates inside of the cylindrical chamber element 118, the buildup on the pre-filter solder collector 122 builds toward the front end of the cylindrical chamber element 118. If the filter assembly is not cleaned out, the accumulated solder will eventually block or clog the proximal opening of the thermal cylinder element 142. In addition, because the desoldering tool 14 is intended for use in removing solder from electrical components, and the solder may have coatings or fluxes that get sucked into the desoldering tool 14, there are various locations within the desoldering tool 14 that may become clogged with solder and/or flux residues, thereby reducing the applied vacuum at the nozzle 96.

Figure 7:
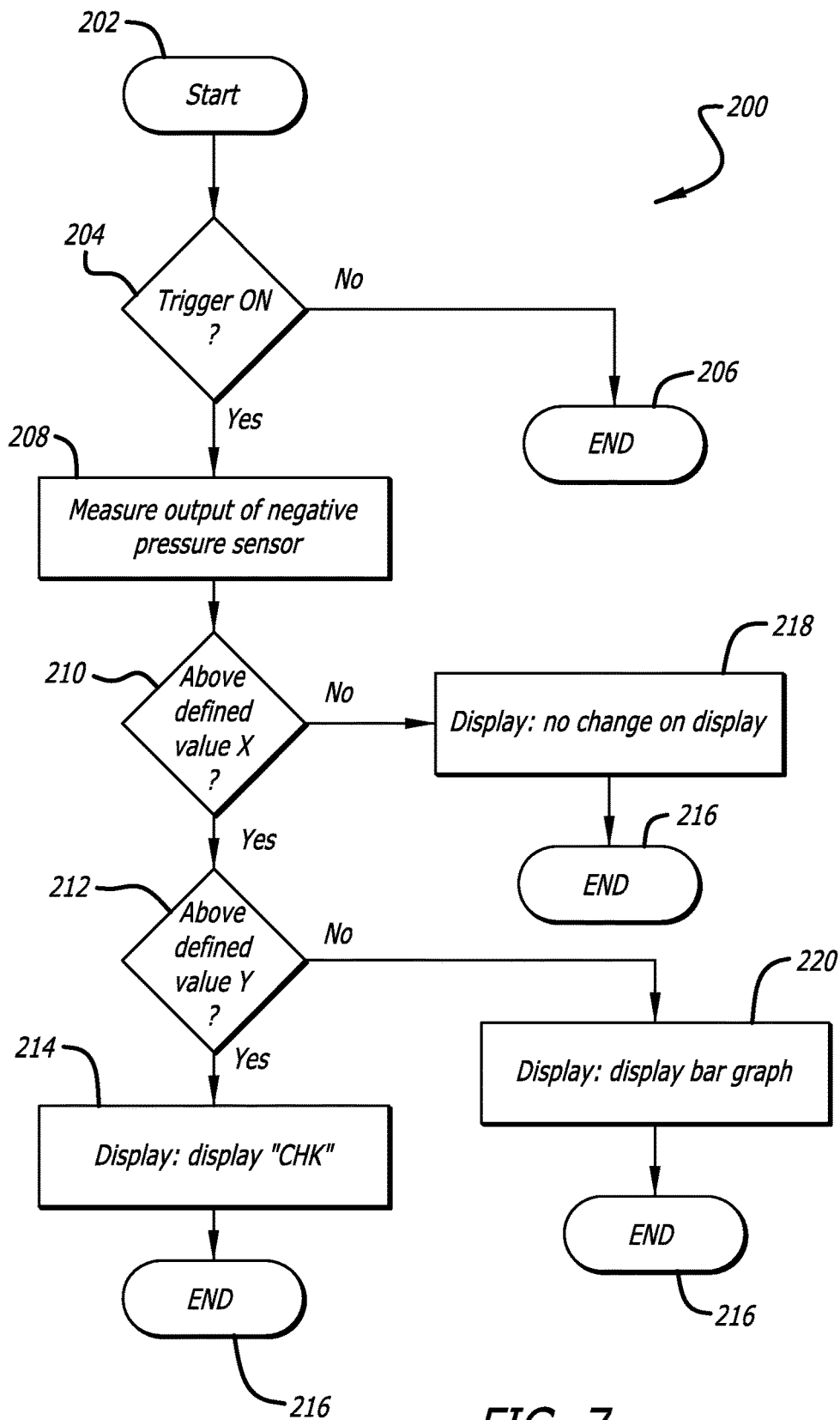
FIG. 7 is a flow chart depicting the logic of the operating mode of the desoldering system.
Figure 8:
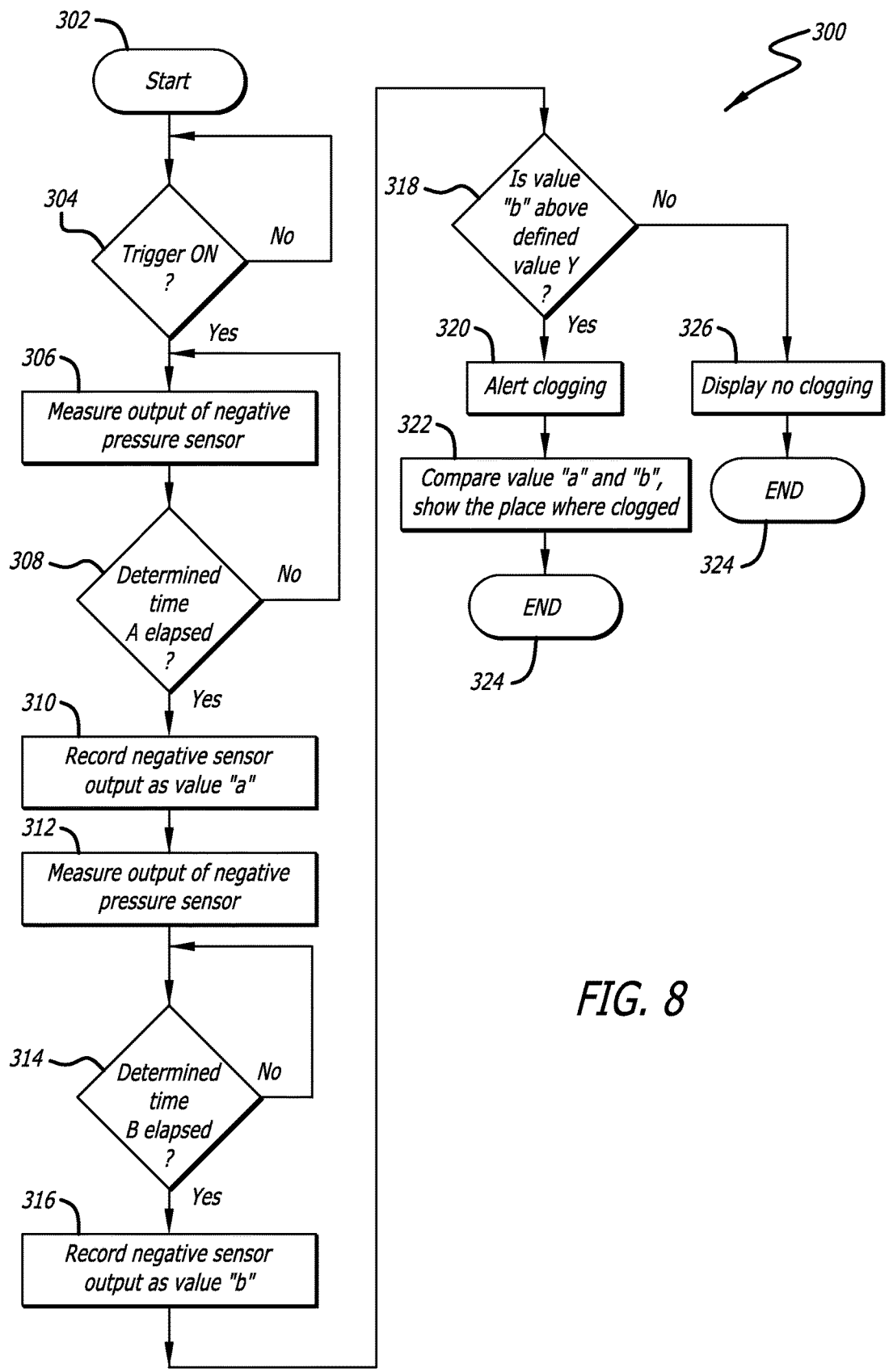
FIG. 8 is a flow chart depicting the logic of the clog detection mode of the desoldering system.

To address the clogging issue, the controller 12 of the present invention includes operational programs for a normal operation mode and a program for a clog check mode. The normal operation mode gives simple indications to the operator of the degree of negative pressure applied by the vacuum pump. The clog check mode is able to provide more detailed information to allow the operator to identify when the components of the system are clogged, and when the cylindrical chamber element 118 is full or the filter 54 is clogged. Flow charts of each mode of operation are depicted in FIGS. 7 and 8, respectively, and by way of example to aid the description and understanding of the present invention. Of course it is contemplated that other logic programs could be implemented, so the flow charts of the figures and following description are intended to be exemplary and not limiting.

The flow chart 200 of FIG. 7 depicts the logic of the normal operation mode. The controller 12 is set to provide a controlled set temperature by the application of power to the heater coil 144 when the power switch is turned on. At step 202, the power switch 44 is on and the control system program determines if the trigger 86 is depressed in step 204. If the trigger 86 is not on, the program proceeds to step 206. If at step 204 the control program determines that the trigger 86 is depressed, then the vacuum pump 72 will turn on applying a vacuum causing a flow of air through the desoldering tool 14 and vacuum conduit 18 to the controller 12. It should be noted that the controller 12 is set to provide a controlled set temperature by the application of power to the heater coil 144 when the trigger 86 of the desoldering tool 14 is pressed.

During the normal operation mode, at step 204 when the controller receives a signal that the trigger is "ON", the program proceeds to step 208 where the system measures the pressure of the vacuum. The sensor to measure the negative pressure may be a device such as a piezoelectric sensor (not shown), located at a passage branched from the vacuum source. At step 210, the measured pressure value is compared with a predefined value. If the measured pressure value is above defined value X, a bar graph appears on the display of the controller 12, representing the value or degree of the vacuum pressure, and the program proceeds to step 212. At step 212, the measured pressure is compared to a predefined value Y. If the measured pressure is greater than the predefined value Y, the control program proceeds to step 214, and the controller causes the bar graph of the display to reach to the third bar from the right end, and also displays "CHK" mark to alert the operator to check the desoldering tool 14 to determine if it is clogged or not. After causing the display, the program proceeds to step 216 where the program terminates.

If at step 210 the measured pressure is less than the predetermined value X, the program proceeds to step 218, and the controller does not change the display. The program then proceeds to step 216 where the program terminates. Similarly, if at step 212, the measured pressure is less than the defined value Y, the program proceeds to step 220 where the controller displays the pressure on the bar graph of the display. The degree of clogging is shown as a bar graph corresponding to the measured negative pressure at the piezoelectric sensor which is converted from a voltage measurement. After causing the display, the program proceeds to step 216 where the program terminates.

The desoldering system 10 of the present invention is designed to allow the use of a plurality of nozzle shapes and configurations of the nozzle 96. However, the pressure value changes depending on the nozzle orifice dimensions of the nozzle 96 attached to the tool. That is, when a bigger hole diameter nozzle 96 is attached to work with bigger and heavier application, the vacuum pressure is lower, and when a small hole dimensioned nozzle 96 is attached to work with smaller desoldering applications, the vacuum pressure is higher even when there is no clog in the air passageway. Therefore, the preset value X must be defined as a non-zero value but a value sufficient so that the bar graph will not indicate a clog or CHK display when the operator is using a nozzle with a small diameter hole that is not clogged at all.

In an alternative embodiment of the invention, the program includes a number of preset values X and Y corresponding to specific nozzle configurations or nozzle sizes and the operator can select the values of X and Y used by the control program by identifying the nozzle for the controller 12 using the control buttons 46.

This normal operation mode is used during normal operation of the desoldering tool 14, so when the operator is actually using the tool in a desoldering process blocking the nozzle opening with the electrical connection or work/application being desoldered, a bar graph display on the display 42 of the controller 12 will move toward the right side of the display, toward value Y, showing that the airflow is blocked. To know if the desoldering tool 14 is clogged, the operator needs to depress the trigger 86 without having the work blocking the nozzle opening. This normal operation mode is thus used as a brief indicator, to see the degree of the tool clogging while handling the desoldering tool 14 during normal usage.

To check and detect clogging, the program of the controller 12 includes a clog check mode program according to the flow chart 300 as depicted in FIG. 8, exclusively for detecting clogging in the desoldering tool 14.

Figure 9:
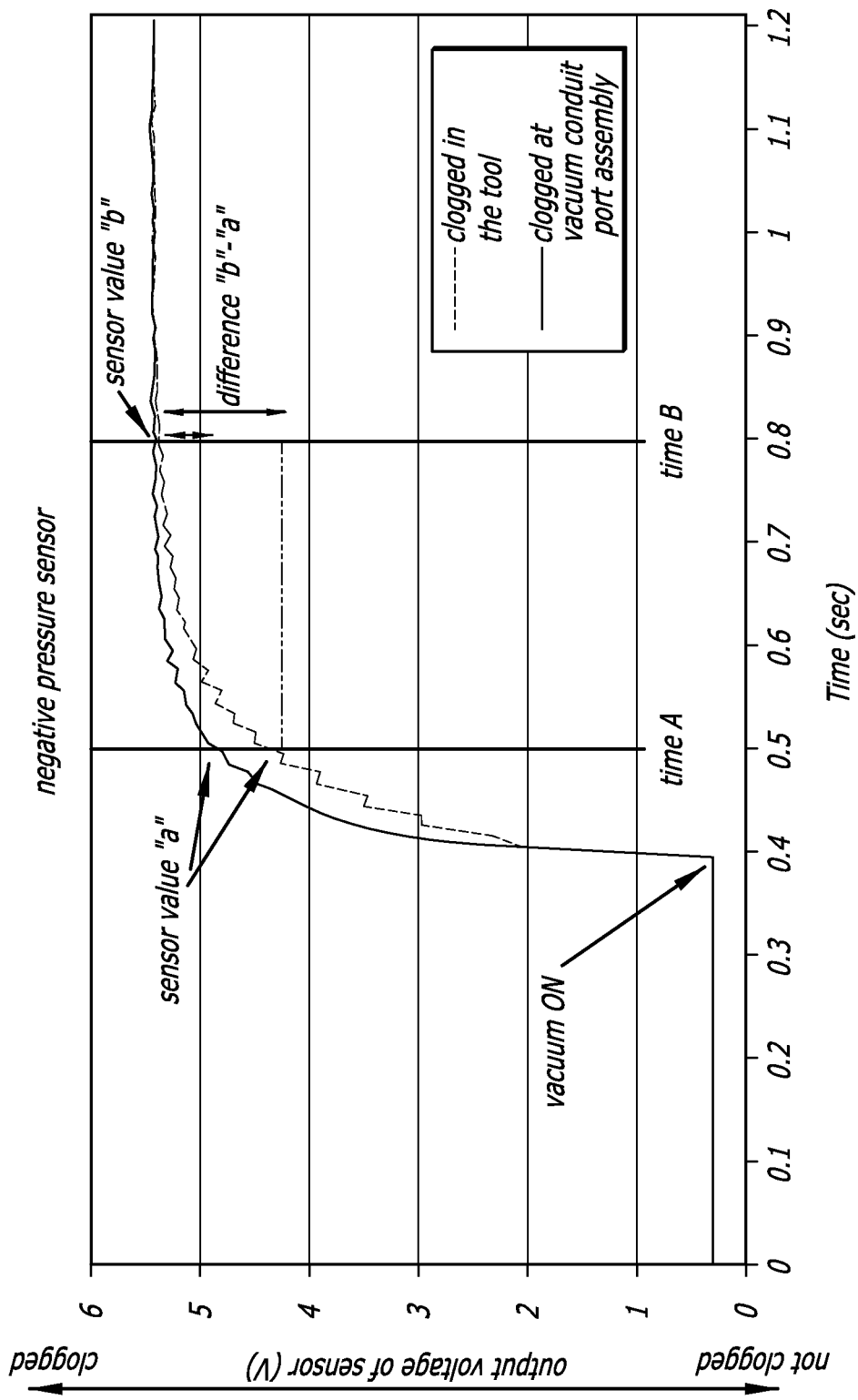
FIG. 9 is a graph depicting the pressure sensor as a function of time measurements for the clog detection program.

As depicted in the flow chart 300 of FIG. 8. The operator initiates the clog check mode program using the control buttons 46 on the controller 12 to start the program at step 302. The program of the controller 12 then waits to receive a signal that the trigger 86 is depressed at step 304. When the trigger 86 is depressed, the program proceeds to step 306, where the controller 12 measures the output of a negative pressure sensor (not shown). The program then proceeds to step 308 to allow a predetermined amount of time "A" to pass. The time "A" is a short period of time, on the order of tenths of a second, as depicted in the graph of FIG. 9. After the period "A" has elapsed, the program proceeds to step 310, and the output of the pressure sensor after the period of time A is temporarily recorded as sensor output voltage "a". At step 308, until the predetermined time A has elapsed, the program reverts to step 306 to monitor the pressure.

After the sensor output voltage "a" is recorded in step 310, the program proceeds to step 312 where the controller once again determines the output of the pressure sensor, and the program proceeds to step 314 at which the program waits for a predetermined time interval "B" to elapse. At the end of interval "B", the output of the pressure sensor is temporary recorded as sensor output value "b" at step 316. The program then proceeds to step 318 to determine if the sensor value "b" is above defined value Y, which is the same defined value Y as used in the normal operation mode of the flow chart of FIG. 7. If "a" is greater than Y at step 318, the program proceeds to step 320 to cause a clog alert output to the display 42 of the controller 12, and the display 42 will show that the tool is clogged. The program then proceeds to step 322, where the recorded value "a" is compared to recorded value "b". Depending on the difference as between "a" and "b", the display will show where to clean the desoldering system 10, either at the nozzle 96 or filter assembly 88 on the desoldering tool or at the filter 54 on the vacuum conduit port assembly 50 on the front face 34 of the controller 12. If at step 318 the value "b" is less than the defined value Y, the program proceeds to step 326 where the controller displays an indication that there is no clog on the display 42 of the controller 12. After either step 322 or step 326, when an indication has been provided to the operator as to whether the system is clogged or not, the operator releases the trigger 86 and the program proceeds to the step 324, ending the program and reverting the controller to the normal operation 12 mode.

The foregoing clog check mode program steps and exemplary sensor data for the output of the pressure sensor graphed over time is depicted in the graph of FIG. 9. It should be appreciated that the desoldering tool 14 will need periodic maintenance of the vacuum passage through the nozzle 96 and thermal cylinder element 142, because they may get clogged by solder and vaporized flux. In some cases, the clog occurs at the tip end of the nozzle 96, where molten thick solder gets stuck in the nozzle passageway. In some case, the clog occurs in the filter assembly, where most of the removed solder is captured and stored in a solid state. In some cases, fine solidified solder droplets and flux residue gets clogged at the filter 54 at the vacuum conduit port assembly 50 on the front of the controller 12, when small drops of solder and vaporized flux travel through the vacuum conduit 18 to the filter 54.

As depicted in the graph of FIG. 9, depending on where the clog is located, the angle of the curve (how fast the voltage increases) will differ. When a clog occurs at the filter 54, which is close to the vacuum source, the negative pressure at the pressure sensor increases at a faster rate. As illustrated by the plot for the sensor value "a" from the point in time when the trigger 86 is depressed and the vacuum pump is turned on, the pressure sensor output builds to a first value at time A and a second value at time B. When the location of the clog is in the desoldering tool 12 the difference between the sensor pressure at time B as compared to Time A is significantly larger than when the clog is located at the filter of the controller 12, due to the difference in the volume of the channel preceding the vacuum pump.

The value "a" is recorded at the timing while the value is still increasing (when it is clogged), and the value "b" is recorded at the timing where the sensor value will stabilize. The location of the clog is determined by comparing defined value Y and the stabilized sensor value "b". Once it is determined that there is a clog, the value "b" is compared with value "a". A certain defined value or chart of the difference of value "b" and "a" is stored in the controller to tell where the clog is possibly occurring. The controller 12 matches the difference with the value or chart and displays where the clog is located. Therefore, the operator does not need to go look for all possible places that may be clogged, but may follow the instruction on the display of the controller 12 to quickly determine what maintenance is required. The graph of FIG. 9 is exemplary. The output voltage in the graph of FIG. 9 is a relative value. The value is proportional with the pressure, lower negative pressure at lower voltage, higher negative pressure at higher voltage. The actual voltage output may change depending on the amplifier and other circuitry.

Additionally, as discussed above the defined value Y could change corresponding to the orifice diameter or dimensions of the nozzle 96 attached to the desoldering tool 14. Since the negative pressure changes depend on the hole diameter of the nozzle 96, in order to determine the clog more in detail, the controller 12 may be programmed to have several defined values for "Y" that correspond to the various nozzle sizes.

By using this invention, the operator may know the degree of clog while using the desoldering tool 14 and the operator can use the clog check mode to determine where the clog is located. Accordingly, use of the invention allows the operator to maintain the desoldering tool 14, and will extend the operational life of the components of the desoldering tool 14. However, due to the operational requirements of the desoldering tool 14, including repetitive thermal cycling of the thermal cylinder element 142 and heater coil 144 to the high temperatures required for melting solder, as well as the corrosive effects of the flux materials, the present invention contemplates additional features to maximize the useable life of the desoldering tool 14 and the components thereof, as well as features to facilitate the operation of the desoldering system 10.

In accordance with a further embodiment of the present invention, the controller 12 includes programming for an "on-delay", rest or "minimum operation" and an "off delay" functionality. These functionalities aim to avoid solder clogging inside the path from the nozzle 96 to the vacuum pump 72, and confine the capture of removed solder in the solder filter assembly 88.

On-Delay Feature

Figure 11:
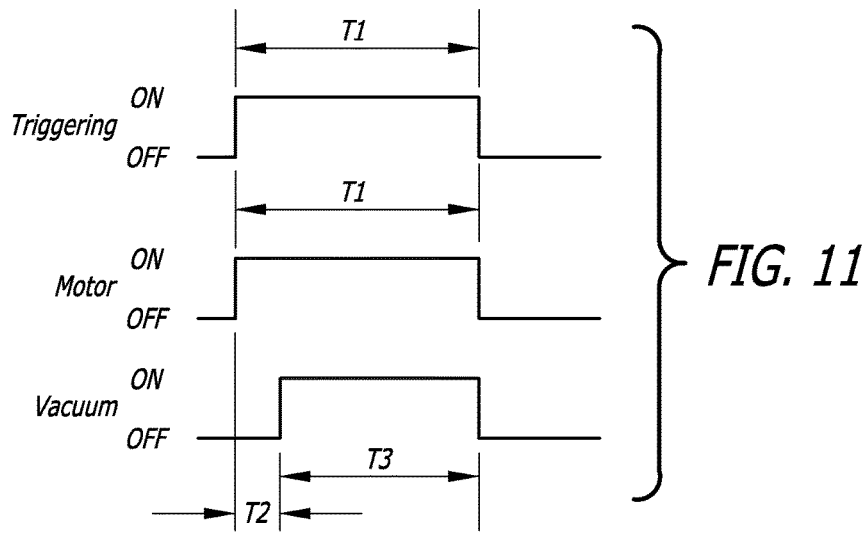
FIG. 11 is a time chart for the "on delay" function.

FIG. 11 provides three time charts depicting the "on delay" timing function of the controller for the triggering, motor and vacuum events. When the triggering time (T1), initiated by depressing trigger 86, is more than one second, the "on-delay" function will be activated. Once the trigger 86 is depressed at time T1, turning on the desoldering tool, the control program of the controller 12 turns on the vacuum pump 72 immediately, however, the solenoid 76 delays the opening of the vacuum flow until after a delay time interval (T2) has elapsed. For example, T2 may be set to 0.2 seconds. When the trigger 86 is released the vacuum pump 72 is turned off, the solenoid 76 closes, and the application of the vacuum stops. This prevents melted solder in the filter assembly 88 from being pulled toward the filters.

On Delay Plus Minimum Operation Time

Figure 12:
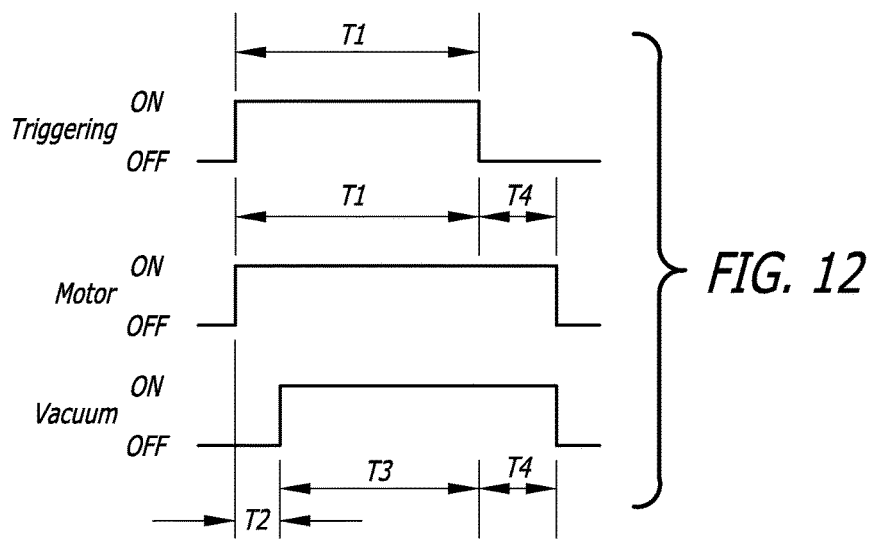
FIG. 12 is a time chart for the "on delay plus minimum operation time" function.

FIG. 12 provides three time charts depicting the "on delay plus minimum operation time" timing function of the controller for the triggering, motor and vacuum events. When the triggering time (T1), initiated by depressing trigger 86, is less than one second, the "on-delay" function and the "minimum operation" function will be activated. In this functional mode, once the trigger 86 is depressed at time T1, the program for the controller 12 turns on the vacuum pump 72 immediately, but the solenoid 76 is switched to an "open" position or state to apply the vacuum to the desoldering tool 14 after T2 time has elapsed. When the trigger 86 is released at time T3, which is less than 1 second after time T1, the vacuum pump 72 and the solenoid 76 will not switch to an "off" or "closed" state until after a time period T4 has elapsed. As an example of this embodiment, T2 may be 0.2 seconds, and T2+T3+T4 is at least equal to if not greater than 1 second.

On Delay Plus Off Delay (User Selection Mode)

Figure 13:
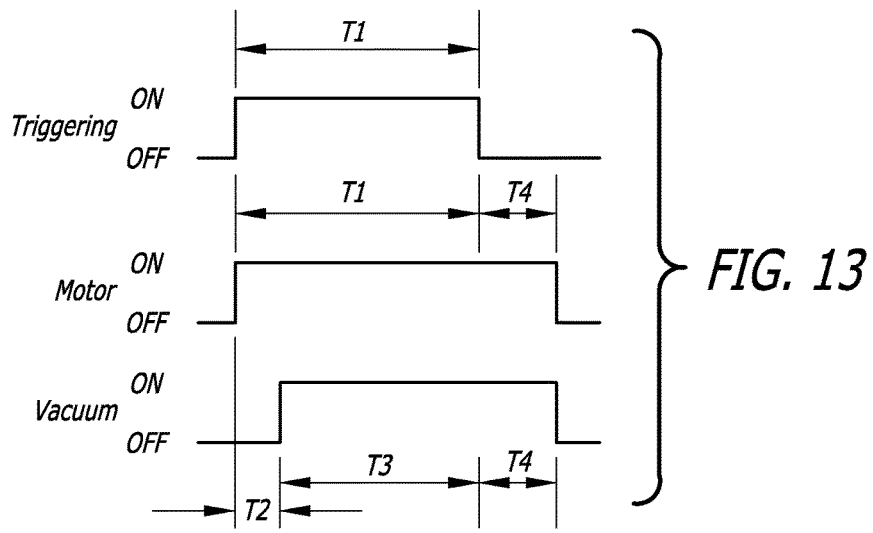
FIG. 13 is a time chart for the "on delay plus off delay" function.

FIG. 13 provides three time charts depicting the "on delay plus off delay" timing function of the controller for the triggering, motor and vacuum events. The controller 12 may be programmed to include an additional "on delay plus off delay" functionality. In this operational mode that may be selected by the user via the control buttons 46 on the front of the controller 12, when the trigger 86 is depressed to initiate operation at time T1, then the vacuum pump 72 is turned on but the solenoid valve is not opened until T2. However, regardless of the duration of the user depressing the trigger 86, when the trigger 86 is released, the program for the controller 12 will delay stopping the vacuum pump 72 and closing the solenoid 76 to terminate the applied vacuum only after at time period T4 has elapsed. The user can select the duration of time T4 time, for example T4 may be set anywhere from 1 to 5 seconds, in accordance with the users anticipated usage demand.

In an alternative embodiment of the invention, the user may be allowed to select the "on delay" time T2, in accordance with the desoldering quantity, and working needs. For instance, in the case where a large quantity of solder needs to be removed completely, and the user wants the solder to melt completely before the vacuum is applied, the user may set the "on delay" timer to a relatively longer interval, for example T2 could be set to 0.5 to 2 seconds. When the user needs to remove a small amount in short time, the user can set the on delay timer to a relatively short interval, for example T2 could be set to 0.05 to 0.2 seconds.

Sleep Mode

Figure 10:
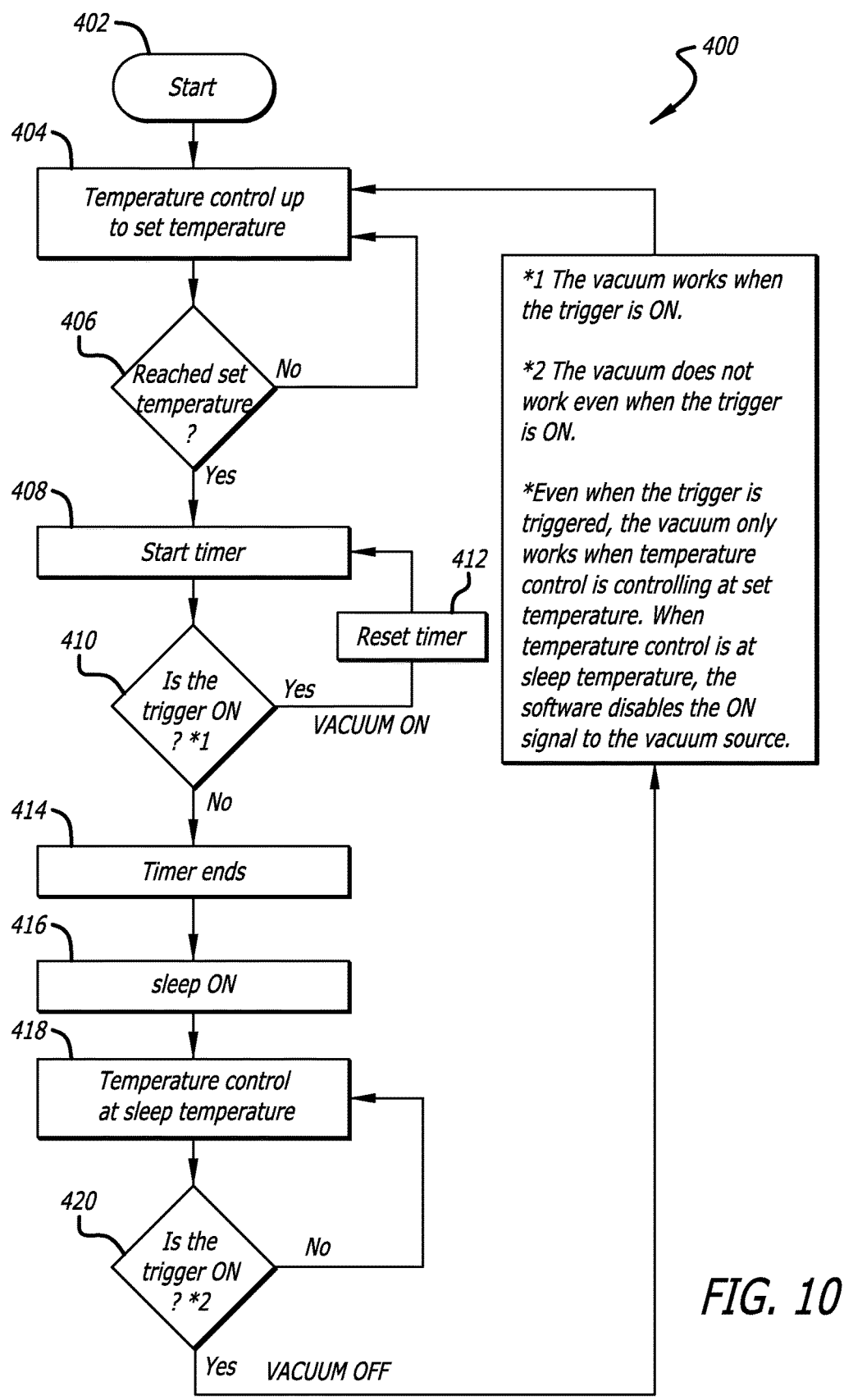
FIG. 10 is a flow chart for the sleep mode functionality for the desoldering system.

A further embodiment of the present invention contemplates the controller 12 being programmed with a "sleep mode" that allows the desoldering system 10 to include a function to lower the temperature of the desoldering tool 14 when the system 10 is "on" but not in use. The sleep mode extends the nozzle life and saves power. The program operation of an embodiment of the controller 12 and desolder tool 14 having a sleep mode functionality for the desoldering system 10 of the present invention is shown in the flow chart 400 of FIG. 10, and as described herein.

First, at steps 402 and 404, when the controller 12 is powered on, the desoldering tool 14 is provided with power to heat the heating element 94 and nozzle 96 up to a pre-set temperature, or a temperature selected by the user and input to the controller 12. At step 406, once the nozzle temperature is heated to the set temperature, the controller maintains the nozzle at the set temperature by cycling power to the heating element 94. The controller program then proceeds to step 406, where the controller confirms that the set temperature has been reached and maintained. If at step 406 the set temperature has not been reached, the program reverts to step 404. If at step 406 the controller confirms that the set temperature has been reached, the program proceeds to step 408 where a timer to enter sleep mode is initiated. While the timer counts down at step 408, whenever the trigger 86 of the desoldering tool 14 is depressed, the program reverts to step 408 and the timer resets and starts counting down from the beginning again.

The trigger 86 is provided in the desoldering tool 14 for starting the vacuum pump 72 and initiating the vacuum to suck the molten solder into the desoldering tool 14. By using the activation of the trigger 86 as an input to the sleep mode program, the same signal that activates the vacuum pump 72 initiates the resetting of the timer for entering the sleep function, which means that the desoldering tool 14 is in use. This way, the operator does not need to do anything extra for the sleep mode, just using the desoldering tool 14 will signal the controller 14 that the desoldering tool 14 is in use. The trigger 86 is depressed by the operator when a vacuum is required, so there will be no failure to determine the use of the desoldering tool.

If at step 410 the timer counts all of the way down and the trigger 86 is not depressed for the predetermined time, the program proceeds to step 414, where timer ends and then to step 416, where the desoldering tool 14 is placed in the "sleep mode" and the program proceeds to step 418. At step 418, while the desoldering tool 14 is in the sleep mode, the nozzle temperature will be allowed to drop to a sleep mode temperature at a lower temperature than the set temperature, thereby extending the life of the heating element 94 and nozzle 96 and saving power. The program proceeds to step 420 where the controller 12 waits for an indication that the trigger 86 is depressed. If the trigger 86 is not activated, the program reverts to step 418 to maintain the sleep mode temperature. The sleep mode ends by the user depressing the trigger 86 at program step 420, and the system reverts to step 404.

As noted above, at step 404, the temperature of the heating element 94 and nozzle 96 will rise up to the set temperature. When the system 10 is "waking up" from the sleep mode, the vacuum pump does not turn on immediately upon depressing the trigger 86, to allow the desoldering tool 14 tie to reach the operating temperature. Thus, when the operator is using the sleep mode, a signal representing the trigger 86 being depressed by the user is sent to the controller 12, but the signal to turn on the vacuum pump is delayed by the software control program until at step 410 the program confirms that the trigger is depressed. This functionality is beneficial because air sucked through the channel of the desoldering tool 14 will work to cool the heating element 94 and nozzle 96, although the desoldering tool 14 needs to raise the nozzle temperature to the set temperature. The vacuum pump will be activated and effective once the temperature reaches the set temperature at steps 410. This cycle will be repeated until the power for the controller 12 is shut down. The time duration at step 410 that is required to elapse before entering into the sleep mode at step 416, and the temperature setting for the sleep mode temperature of step 418, are preferably both adjustable and may be set by the user.

The desoldering tool 14 may include an indicator, for example a small light to show when the tool is at operational temperature or when the desoldering tool is in the sleep mode. Further, an input signal from the controller 12, for example the control buttons 46 to change the temperature, may also be used together with the trigger "on" signal to restart the timer at step 410, or wakeup the program from the sleep mode at step 420, as an indicator that the desoldering tool 14 is in use.

The foregoing program for the sleep mode to enter and wake up from the sleep mode has the advantage that there is no failure in determining any use of the desoldering tool 14, because the trigger 86 is used as the function for activating the vacuum pump which is one of the necessary steps to use a desoldering tool, which melts the solder that needs to be removed, then sucks the molten solder into the desoldering tool 14. Also, it has the advantage that it is initiated by the operator's hand. It is often the case that the bench top where the work is done could be occupied with many other tools, the circuit to be worked, electrical components and other items. Sometimes the controller 12 may be stored beneath the bench top to clear the working area, making it less effective to reach the controller 14. In these cases, the availability to control the sleep mode at the operators hand is very helpful.

Those skilled in the art will readily appreciate that the disclosure herein is meant to be exemplary and the components and program parameters depend upon the specific application for which the process and materials of the present invention are used. It is, therefore, to be understood that the foregoing embodiments are presented by way of example only and that, within the scope of the appended claims and equivalents thereto; the invention may be practiced otherwise than as specifically described.

The invention claimed is:

1. A desoldering system, comprising:
   a controller including a filter, a vacuum pump, a power supply system, a pressure sensor, a display and control circuitry including operation and clog detection programs;
   a desoldering tool including nozzle, a heater assembly, a filter chamber and a removable filter assembly and an on/off trigger switch;
   said controller measuring a vacuum pressure and displaying a degree of the vacuum pressure for identifying a status of a clog or blockage as being located between said nozzle and said filter chamber of said desoldering tool or said clog or blockage being located at a filter within said controller;
   a cable and vacuum conduit removably interconnecting said controller and said desoldering tool; and
   a vacuum conduit port assembly having a cap, a filter and a filter support, said clog detection program provided for further determining if a clog or blockage is located at said filter of said vacuum conduit port assembly or at said desoldering tool.

2. A desoldering system, comprising:
   a controller including a vacuum pump, a power supply system, a pressure sensor and control circuitry;
   a desoldering tool including a heater assembly, a filter chamber and a removable filter assembly and an on/off trigger switch; and
   a cable and vacuum conduit removably interconnecting said controller and said desoldering tool; and
   said controller further comprising a sleep mode program for limiting power to said desoldering tool that is terminated by an operation of said on/off trigger switch and after the sleep mode program is terminated, a control program in the controller allows the vacuum pump to operate only when said on/off trigger switch is depressed and a heating element of said heater assembly and a nozzle reach a set temperature.

3. A desoldering system, comprising:
   a controller including a vacuum pump, a power supply system and control circuitry including a vacuum pump on-delay and user selectable and adjustable vacuum pump off-delay programs;
   a desoldering tool including a heater assembly, a filter chamber and a removable filter assembly and an on/off trigger switch wherein said controller further comprises a sleep mode program for limiting power to said desoldering tool after an off-delay period that is terminated by the operation of said on/off trigger switch; and
   a cable and vacuum conduit removably interconnecting said controller and said desoldering tool.

4. The desoldering system of claim 3 wherein said vacuum pump on-delay program includes a variable delay period that may be set by the operator.

5. The desoldering system of claim 3 wherein said filter chamber is configured to capture removed solder on a cone shaped solder collector formed from a material having a low solder wettability for recycling.

6. The desoldering system of claim 1 wherein said controller measuring a vacuum pressure and displaying a degree of the vacuum pressure for identifying a status of a clog or blockage provides a visual display of the degree of clogging or blockage on said display, the display providing a visual indication corresponding to a measured negative pressure measured at a piezoelectric sensor having a voltage output that is converted to the output to said display of said controller.

7. The desoldering system of claim 6 wherein said controller further displays an alert to check the clogging or blockage in addition to displaying said degree of clogging or blockage on said visual display when measured pressure is greater than predetermined value.

8. A desoldering system comprising:
   a controller including a filter, a vacuum pump, a power supply system, a pressure sensor, a display and control circuitry including operation and clog detection programs;
   a desoldering tool including nozzle, a heater assembly, a filter chamber and a removable filter assembly and an on/off trigger switch;
   said controller measuring a vacuum pressure and displaying a degree of the vacuum pressure for identifying a status of a clog or blockage as being located between said nozzle and said filter chamber of said desoldering tool or said clog or blockage being located at a filter within said controller;
   a cable and vacuum conduit removably interconnecting said controller and said desoldering tool;
   wherein said clog detection program receives input from said pressure sensor positioned proximate said vacuum pump, and determines the location of the clog by:
      waiting a first period after activation of said vacuum pump to determine the pressure at said pressure sensor;
      waiting a second period after said first period to make a second determination of the pressure at said pressure sensor;
   comparing said first pressure to said second pressure; and
   determining the location of the clog of the system based upon the comparison of said first pressure to said second pressure.

9. The desoldering system of claim 1 wherein said control circuitry including operation and clog detection programs further comprises:
   a normal operation mode including a program to delay the application of a vacuum to said desolder tool after depression of said on/off trigger switch, said normal operation mode including a control program receiving sensed pressure information to identify for the user a clog or blockage in the desolder system;
   a clog check mode and said clog detection program for identifying the location of a clog or blockage; and
   a sleep mode program for limiting power to said desoldering tool that is terminated by the operation of said on/off trigger switch.

10. The desoldering system of claim 1 wherein said clog detection program determines the location of the clog or blockage in said desoldering system based upon the rate of increase of the negative pressure proximate said vacuum pump.

11. The desoldering system of claim 1 wherein said controller further comprises:
   a vacuum conduit port assembly having a cap, a filter and a filter support; and
   said clog detection program provided for determining if a clog or blockage is located at said filter of said vacuum conduit port assembly or at said desoldering tool based upon the rate of increase of the negative pressure proximate said vacuum pump.

12. A desoldering system, comprising:
   a controller including a filter, a vacuum pump, a power supply system, a pressure sensor, a display and control circuitry including operation and clog detection programs;
   a desoldering tool including nozzle, a heater assembly, a filter chamber and a removable filter assembly and an on/off trigger switch;
   said controller measuring a vacuum pressure and displaying a degree of the vacuum pressure for identifying a status of a clog or blockage, said controller provides a visual display of the degree of clogging or blockage on said display, the display corresponding to a measured negative pressure measured at a piezoelectric sensor having a voltage output that is converted to the output to said display in said controller; and
   a cable and vacuum conduit removably interconnecting said controller and said desoldering tool.

13. The desoldering system of claim 12 wherein said controller and said control circuitry including operation and clog detection programs further comprises a display on said controller for providing a visual display of operational parameters of said desoldering tool and controller.

14. The desoldering system of claim 12, wherein said controller and said control circuitry including operation and clog detection programs further comprises control buttons on said controller allowing user input of information and desired operational parameters to said control circuitry.

15. The desoldering system of claim 12, wherein said controller and said control circuitry including operation and clog detection programs further comprises control buttons on said controller, said control buttons allowing a user to input desired operational parameters including: on-delay time periods, off-delay time periods, sleep mode time periods and desoldering tool nozzle sizes.

16. The desoldering system of claim 12, wherein said controller further comprises a vacuum pump on-delay program that includes a variable delay period that may be set by the operator.

17. The desoldering system of claim 12, wherein said controller further comprises a sleep mode program for limiting power to said desoldering tool that is terminated by the operation of said on/off trigger switch.

18. The desoldering system of claim 12, wherein said desoldering tool heater assembly further comprises:
   a heating element including a generally cylindrical cover, an axially disposed thermal cylinder element, and a heater coil surrounding said thermal cylinder element, all affixed to a mounting base, wherein said heater coil is configured to extend most of the length of said thermal cylinder element to ensure that solder that is melted and removed through an applied vacuum through the center of said thermal cylinder element does not adhere to and solidify against an internal wall of said thermal cylinder element.

19. The desoldering system of claim 12 wherein said desoldering tool is configured to minimize clogging while capturing removed solder for recycling without binding said solder to paper materials.

20. The desoldering system of claim 19, wherein said removable filter assembly comprises:
   a chamber element having a forward end and a proximal end;
   a front holder mounted to said forward end of said chamber element, said front holder including an orifice;
   a solder collector locate in the proximal end of said chamber element, said solder collector secured to a mounting base and said solder collector having a generally cone shaped cross section with a large end of said cone open and facing said orifice of said front holder whereby liquefied solder entering said chamber element through said orifice solidifies onto said solder collector; and
   a filter holder on said proximal end of said chamber element.

21. The desoldering system of claim 12, wherein said removable filter assembly comprises:
   a chamber element having a forward end and a proximal end;
   a front holder mounted to said forward end of said chamber element, said front holder including an orifice;
   a solder collector locate in the proximal end of said chamber element, said solder collector secured to a mounting base and said solder collector having a generally cone shaped cross section with a large end of said cone open and facing said orifice of said front holder whereby liquefied solder entering said chamber element through said orifice solidifies onto said solder collector; and
   a filter holder on said proximal end of said chamber element.

22. The desoldering system of claim 12, wherein said removable filter assembly further comprises:
   a chamber element having a forward end and a proximal end;
   a front holder mounted to said forward end of said chamber element, said front holder including an orifice;
   a solder collector located in the proximal end of said chamber element, said solder collector secured to a mounting base and said solder collector having a generally cone shaped cross section with a large end of said cone open and facing said orifice of said front holder whereby liquefied solder entering said chamber element through said orifice solidifies onto said solder collector; and
   a filter holder on said proximal end of said chamber element.

23. The desoldering system of claim 22, wherein said solder collector is made of stainless steel.

24. The desoldering system of claim 22, wherein said filter holder secures said solder collector and mounting base in said chamber element and said filter holder contains a removable ceramic paper filter.

25. The desoldering system of claim 22, wherein said solder collector and said mounting base are made of stainless steel.

26. The desoldering system of claim 22, wherein said solder collector is made of a material having a low solder wettability.

27. The desoldering system of claim 12, wherein said controller determines the location of the clog or blockage and said controller provides a visual display of the location of the clog or blockage.

28. The desoldering system of claim 12 wherein said controller further displays an alert to check the clogging or blockage in addition to displaying said degree of clogging or blockage on said visual display when measured pressure is greater than predetermined value.

\* \* \* \* \*